(12) United States Patent
Kim

(10) Patent No.: US 8,937,916 B2
(45) Date of Patent: Jan. 20, 2015

(54) RESOURCE ALLOCATING APPARATUS AND METHOD FOR MACHINE TYPE COMMUNICATION

(71) Applicant: Electronics and Telecommunications Research Institute, Daejeon (KR)

(72) Inventor: Jae Heung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 192 days.

(21) Appl. No.: 13/626,152

(22) Filed: Sep. 25, 2012

(65) Prior Publication Data
US 2013/0077583 A1    Mar. 28, 2013

(30) Foreign Application Priority Data

Sep. 26, 2011  (KR) .................. 10-2011-0097174
Sep. 14, 2012  (KR) .................. 10-2012-0102461

(51) Int. Cl.
*H04W 4/00*    (2009.01)
*H04W 72/04*   (2009.01)

(52) U.S. Cl.
CPC ............ *H04W 72/042* (2013.01); *H04W 4/005* (2013.01)
USPC ........................................................ 370/329

(58) Field of Classification Search
CPC ..... H04W 72/02; H04W 80/04; H04W 88/08; H04W 76/00; H04W 84/12; H04W 72/0446; H04J 3/1682
USPC ................. 370/329, 328, 330, 338, 392, 468, 370/395.21, 395.4, 395.2
See application file for complete search history.

(56) References Cited

U.S. PATENT DOCUMENTS

2011/0268046  A1*  11/2011   Choi et al. ..................... 370/329

FOREIGN PATENT DOCUMENTS

| KR | 1020110072478 | 6/2011 |
| KR | 1020110101086 | 9/2011 |
| WO | 2011/112683 A1 | 9/2011 |

* cited by examiner

*Primary Examiner* — Chi H Pham
*Assistant Examiner* — Alexander O Boakye
(74) *Attorney, Agent, or Firm* — Nelson Mullins Riley & Scarborough LLP

(57) ABSTRACT

There are provided a resource allocating method for machine type communication (MTC), a data transmission and reception method for an MTC device, and an MTC device using the data transmission and reception method. The transmission and reception method for the MTC device includes: receiving a downlink frame from a base station; searching for a control information block in a downlink control resource area of the downlink frame; determining whether the control information block is for MTC service or includes control information whose destination is the MTC device, using an MTC device identifier or an identifier designated for MTC service scheduling; and extracting MTC service packet data included in a radio resource for transmission of MTC data, using the control information block, according to the results of the determination.

16 Claims, 6 Drawing Sheets

RESOURCE ALLOCATING APPARATUS AND METHOD FOR MACHINE TYPE COMMUNICATION

CLAIM FOR PRIORITY

This application claims priority to Korean Patent Applications No. 10-2011-0097174 filed on Sep. 26, 2011 and No. 10-2012-0102461 filed on Sep. 14, 2012 in the Korean Intellectual Property Office (KIPO), the entire contents of which are hereby incorporated by reference.

BACKGROUND

1. Technical Field

Example embodiments of the present invention relate in general to a resource allocating apparatus and method for machine type communication (MTC), and more specifically, to a resource allocating apparatus and method for MTC, capable of improving service efficiency of MTC by allocating MTC device identifiers, an MTC device using the resource allocating apparatus and method for MTC, and a data transmission and reception method for the MTC device.

2. Related Art

Machine type communication (MTC) or machine-to-machine (M2M) communication is a form of data communication which involves one or more entities that do not necessarily need human interaction. Service optimized for MTC differs from service optimized for human-to-human communication. In comparison with a current mobile network communication service, MTC service can be characterized by a) several market scenarios, b) data communication, c) lower cost and less effort, d) a potentially very large number of communicating terminals, e) a wide service area, and f) very small traffic per terminal.

MTC may appear in various service forms. An MTC scheme is a primary issue in the fields of Smart Metering, Tracking & Tracing, Remote Maintenance & Control, eHealth, etc.

Lately, $3^{rd}$ Generation Partnership Project (3GPP) has been working on MTC standardization for intelligent communication between humans and objects and between objects.

MTC service is a service for information exchange between machines or between a machine and a user. Methods for providing MTC service for MTC devices has been based on mostly a wired network when the MTC devices exchange information with an MTC server through a wireless network.

SUMMARY

Accordingly, example embodiments of the present invention are provided to substantially obviate one or more problems due to limitations and disadvantages of the related art.

An example embodiment of the present invention provides a resource allocating method for machine type communication (MTC), capable of improving service efficiency of MTC by allocating MTC device identifiers.

Another example embodiment of the present invention also provides a data transmission and reception method for an MTC device.

Another example embodiment of the present invention also provides a resource allocation apparatus for MTC.

Another example embodiment of the present invention also provides an MTC device.

In an example embodiment, there is provided a resource allocating method for machine type communication (MTC), including: determining, if MTC data that is to be transmitted to an MTC device is generated, whether a location of a radio resource for transmission of MTC data is variable in a transmission period; creating a control information block including MTC scheduling information if the location of the radio resource for transmission of MTC data is variable; including the control information block in a first downlink control resource area or a second downlink control resource area; configuring a frame including a radio resource area for transmission of MTC data and at least one area of the first downlink control resource area and the second downlink control resource area; and transmitting the frame.

The first downlink control resource area may include control information for a general user terminal, and further include control information for an MTC device.

The second downlink control resource area may include control information for an MTC device.

The control information block may transmit the MTC scheduling information together with an MTC device identifier.

The control information block may transmit the MTC scheduling information using an identifier designated for MTC service scheduling.

The radio resource area for transmission of MTC data may include MTC data, and the MTC data may include Cyclic Redundancy Check (CRC) bits masked with an MTC device identifier, or a code block sequence of MTC traffic data scrambled with the MTC device identifier.

In another example embodiment, there is provided a data transmission and reception method that is performed by a machine type communication (MTC) device, including: receiving a downlink frame from a base station; searching for a control information block in a downlink control resource area of the downlink frame; determining whether the control information block is for MTC service or includes control information whose destination is the MTC device, using an MTC device identifier or an identifier designated for MTC service scheduling; and extracting MTC service packet data included in a radio resource for transmission of MTC data, using the control information block, according to the results of the determination.

The extracting of the MTC service packet data included in the radio resource for transmission of MTC data, using the control information block, according to the results of the determination may include, if the control information block is for MTC service, acquiring scheduling information about the radio resource for transmission of MTC data using the identifier designated for MTC service scheduling; and demodulating and decoding a MTC traffic data transmitted to the MTC device using the MTC device identifier.

The extracting of the MTC service packet data included in the radio resource for transmission of MTC data, using the control information block, according to the results of the determination may include, demodulating and decoding MTC traffic data transmitted to the MTC device using the MTC device identifier if the control information block includes control information whose destination is the MTC device.

The data transmission and reception method may further include transmitting feedback information to the base station if a downlink packet transmitted from the base station has been successfully received.

In another example embodiment, there is provided a data transmission and reception method including: receiving location information of a radio resource for transmission of MTC data from a base station, through system information or a control message; searching for the location of the radio resource for transmission of MTC data in a downlink frame received from the base station; and extracting MTC service packet data included in the radio resource for transmission of MTC data using an MTC device identifier.

In another example embodiment, there is provided a resource allocating apparatus for machine type communication (MTC), including: an MTC data storage unit configured to store at least one piece of information among software information for MTC service, an identifier of at least one MTC device or at least one group of MTC devices, and encoding information; and an MTC controller configured to determine whether a location of a radio resource area for transmission of MTC data is variable in a transmission period if MTC data that is to be transmitted to an MTC device is generated, to create a control information block including MTC scheduling information if the location of the radio resource area for transmission of MTC data is variable in the transmission period, to include the control information block in a first downlink control resource area or a second downlink control resource area, and to configure a downlink frame.

The resource allocating apparatus may further include a transceiver configured to transmit the downlink frame configured by the MTC controller, and to receive a signal transmitted from at least one MTC device.

The first downlink control resource area may include control information for a general user terminal, and further include control information for an MTC device.

The second downlink control resource area may include control information for an MTC device.

The control information block may transmit the MTC scheduling information together with an MTC device identifier.

The control information block may transmit the MTC scheduling information using an identifier designated for MTC service scheduling.

The radio resource area for transmission of MTC data may include MTC data, and the MTC data may include Cyclic Redundancy Check (CRC) bits masked with the MTC device identifier, or a code block sequence of MTC traffic data scrambled with the MTC device identifier.

In another example embodiment, there is provided a machine type communication (MTC) device including: a receiver configured to receive a downlink frame from a base station; and a controller configured to search for a control information block in a downlink control resource area of the downlink frame, to determine whether the control information block is for MTC service or includes control information whose destination is the MTC device, using an MTC device identifier or an identifier designated for MTC service scheduling, and to extract MTC service packet data included in a radio resource for transmission of MTC data, using the control information block, according to the results of the determination.

If the control information block is for MTC service, the controller may acquire scheduling information about the radio resource for transmission of MTC data using the identifier designated for MTC service scheduling, and demodulate and decode MTC traffic data transmitted to the MTC device using the MTC device identifier.

If the control information block includes control information whose destination is the MTC device, the controller may demodulate and decode MTC traffic data transmitted to the MTC device using the MTC device identifier.

The MTC device may further include a transmitter configured to transmit an uplink frame, wherein the controller may control the transmitter to transmit feedback information to the base station only when a downlink packet transmitted from the base station has been successfully received.

In another example embodiment, there is provided a machine type communication (MTC) device including: a receiver configured to receive location information of a radio resource for transmission of MTC data from a base station, through system information or a control message; and a controller configured to search for the location of the radio resource for transmission of MTC data in a downlink frame received from the base station, and to extract MTC packet data included in the radio resource for transmission of MTC data, using an MTC device identifier.

Therefore, according to the example embodiments described above, it is possible to allocate identifiers to MTC devices separately from those allocated to user terminals, and allocate resources using the MTC device identifiers.

Also, it is possible to support low power consumption operation of MTC devices.

In addition, it is possible to efficiently manage MTC devices that are in a connected state.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
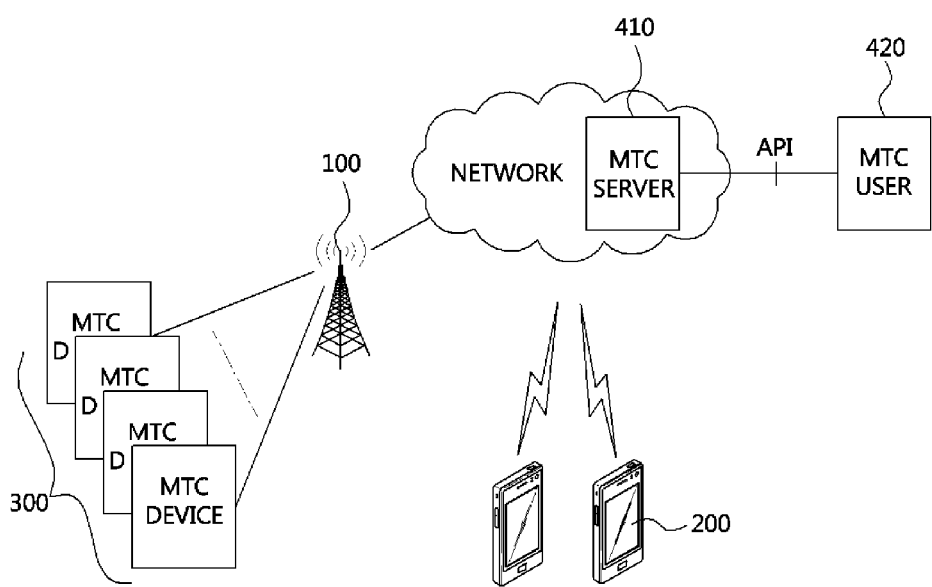
FIG. 1 is a view for explaining the concept of a mobile communication network that provides machine type communication (MTC) service to which the present invention is applied.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The term "terminal" used in this specification may be referred to as User Equipment (UE), a User Terminal (UT), a wireless terminal, an Access Terminal (AT), a Subscriber Unit (SU), a Subscriber Station (SS), a wireless device, a wireless communication device, a Wireless Transmit/Receive Unit (WTRU), a mobile node, a mobile, or other words. The terminal may be a cellular phone, a smart phone having a wireless communication function, a Personal Digital Assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, or also a portable unit or terminal having a combination of such functions. However, the terminal is not limited to the above-mentioned units.

Meanwhile, in this specification, in order to distinguish a terminal that is used for machine type communication (MTC) service from a terminal that is used mainly by a user, a terminal that is used for MTC service will be referred to as a "MTC device", and a terminal for communication between users will be referred to as a "user terminal". Also, the term "MTC device" will be used as a comprehensive term, such as an MTC terminal/device, a M2M terminal/device, etc., including various related terms, regardless of International Organization for Standardization.

Also, the term "base station" used in this specification means a fixed point that communicates with terminals, and may be referred to as another word, such as Node-B, eNode-B, a base transceiver system (BTS), an access point, etc.

Hereinafter, embodiments of the present invention will be described in detail with reference to the appended drawings. In the following description, for easy understanding, like numbers refer to like elements throughout the description of the figures, and the same elements will not be described further.

The present invention is aiming at defining states for connection control and management required for packet transmission and reception of MTC devices in a wireless network such as a cellular based mobile communication system, and providing a method and procedure for allocating identifiers for identifying devices and allocating a radio resource for packet transmission using the allocated identifiers, in order to provide a service such as MTC service in which the density of subscriber devices or terminals per unit service area is significantly higher than in the mobile communication system, in the wireless network, thereby improving efficiency of a service having high device density per unit service area.

A terminal for MTC service may be allocated a scheduling identifier (for example, a Cell-Radio Network Temporary Identifier (C-RNTI) in a 3GPP LTE system) for uniquely identifying a terminal in unit of a base station, the scheduling identifier used in a conventional cellular system, or allocated a newly defined identifier for uniquely identifying a terminal in unit of a base station or in unit of a predetermined area including a plurality of base stations. The identifier enables unique identification of an MTC service terminal or a group of MTC service terminals in the service area of a base station, a predetermined area including a plurality of base stations, or a system, to which the terminal or the group belongs, and the identifier may be used to allocate a radio resource for transmission and reception of MTC packet data.

In a packet-based mobile communication system, radio resources for transmitting packet data are 2-dimensionally represented in frequency and time domains, and the radio resources are shared between terminals in the service area of a base station. Accordingly, terminals that want to transmit packet data using shared radio resources check their allocated downlink or uplink radio resources using scheduling information, and then can transmit or receive packet data to or from the allocated radio resources. The scheduling information is transmitted as downlink or uplink scheduling information from a base station through a radio resource for transmitting control information on downlink.

FIG. 1 is a view for explaining the concept of a mobile communication network that provides MTC service to which the present invention is applied.

Referring to FIG. 1, the mobile communication network includes an MTC server 410, an MTC user 420, and at least one MTC device 300, in addition to components, such as a base station 100, a user terminal 200, etc., of a conventional mobile communication network.

The MTC device 300 is a terminal having an MTC function capable of communicating with the MTC server 410 and other MTC devices through a Public Land Mobile Network (PLMN).

The MTC server 410 communicates with the MTC device 300 through the PLMN. The MTC server 410 has an interface that can be accessed by the MTC user 420, and provides service for the MTC user 420. The MTC user 420 uses the service that is provided by the MTC server 410.

In the configuration illustrated in FIG. 1, the MTC server 410 is controlled by a network operator, the network operator provides an Application Programming Interface (API) on the MTC server 410, and the MTC user 420 accesses the MTC server 410 of the network operator through the API.

Meanwhile, FIG. 1 shows the configuration in which the MTC server 410 is placed in the service domain of the network operator, however, the MTC server 410 may be placed outside the service domain of the network operator, and in this case, the MTC server 410 is not under the control of the network operator.

Also, the MTC device 300 communicates with the MTC server 410, etc. located in the network, through the base station 100. It is expected that there are significantly more (for example, about 20 to 100 times) MTC devices 300 than the number of user terminals per unit service area, considered in a conventional mobile communication system.

It is assumed that the MTC device 300 transmits a small amount of data (about 150 through 200 bytes) at significantly long intervals or at aperiodic intervals (for example, at intervals of several seconds to dozens of days, or at packet generation intervals corresponding to several seconds to dozens of days).

In order to provide MTC service in a mobile communication network or in a wireless network, methods of efficiently allocating identifiers to MTC devices, of efficiently allocating resources, and of performing retransmission are needed. Also, efficient management and control for connection establishment between MTC devices and end nodes (for example, base stations) in a wireless network for packet transmission are required.

Figure 2:
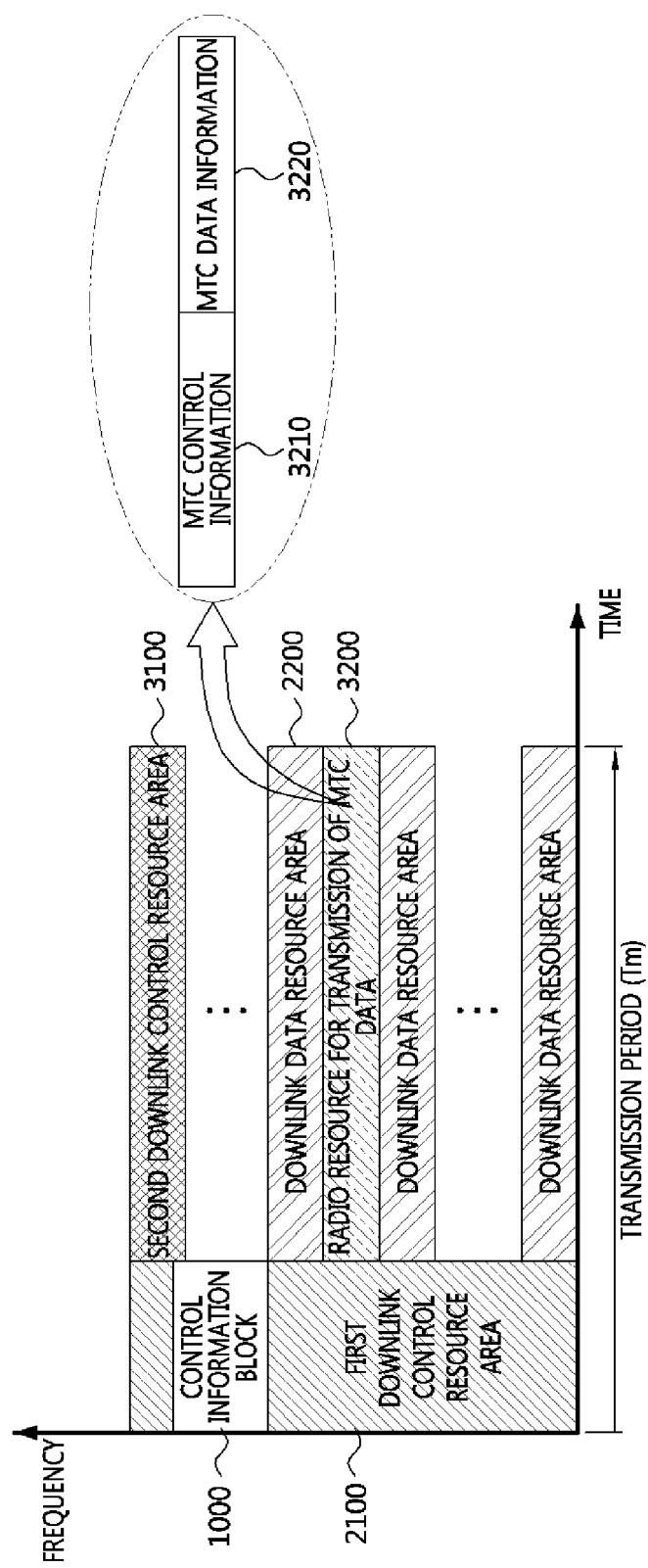
FIG. 2 is a view for explaining the concept of radio resource allocation to an MTC device.

FIG. 2 is a view for explaining the concept of radio resource allocation to an MTC device.

As shown in FIG. 2, a base station transmits scheduling information which is allocation information for a downlink or uplink radio resource, through a radio resource for transmission of downlink control information, that is, through a downlink control resource area 2100. Here, an example of the radio resource for transmission of downlink control information may be a control channel such as a Physical Downlink Control CHannel (PDCCH) that is used in a 3GPP mobile communication system.

Terminals located in the coverage of the base station search for a control information block 1000 in the downlink control resource area 2100 to check the scheduling information. The control information block 1000 configuring the downlink control information includes scheduling information for a downlink or uplink radio resource allocated to an arbitrary terminal.

Terminals that have received data transmitted from the base station use their allocated scheduling identifiers (C-RNTIs) to detect control information blocks transmitting scheduling information allocated to themselves, respectively. The terminals use the scheduling information to acquire location information, modulation information, encoding information, etc. of downlink or uplink radio resources allocated to themselves.

Accordingly, the terminals check which ones of radio resource areas in the downlink data resource area 2200 allocated to themselves correspond to their allocated radio resource areas, and may demodulate and decode the corresponding radio resource areas using the modulation and encoding information in the scheduling information.

In order to support MTC service, a mobile communication system may transmit scheduling information for a radio resource 3200 for transmission of MTC data for an arbitrary MTC device or an arbitrary group of MTC devices, using the control information block 1000 in the downlink control resource area 2100, according to a resource allocation and scheduling method that has been used for existing mobile communication user terminals.

However, in this case, it may be difficult to accommodate a significantly large number of MTC devices since scheduling identifiers have to be allocated to non-MTC devices, as well as to the MTC devices.

In order to detect the control information block 1000 in the downlink control resource area 2100, it is possible to designate a part of scheduling identifiers (C-RNTIs) for general user terminals (non-MTC devices) as designated identifiers for MTC service scheduling.

In this case, in order to provide MTC service, the base station transmits scheduling information that is allocation information for a downlink or uplink radio resource through a radio resource (that is, the downlink control resource area 2100) for transmission of downlink control information.

MTC devices located in the service area of the base station search for the control information block 1000 in the downlink control resource area 2100 using the designated identifiers, and detect scheduling information.

For substantial resource allocation to a specific MTC device or a specific group of MTC devices, resource allocation methods using identifiers allocated to the MTC device (or the group of MTC devices) are needed. Three representative examples of such resource allocation methods are as follows:

The first resource allocation method is to transmit an identifier of an MTC device or a group of MTC devices through a control information block.

Referring to FIG. 2, the first resource allocation method is to include an identifier allocated to an arbitrary MTC device (or a group of MTC devices) in the control information block 1000 configuring the downlink control resource area 2100. That is, the MTC device (or the group of MTC devices) searches for the control information block 1000 in the downlink control resource area 2100 using a designated identifier for MTC service scheduling, and checks an information parameter in the control information block 1000 to determine whether the control information block 1000 includes control information (scheduling information) transmitted to the MTC device through an MTC device (or group) identifier allocated to the MTC device.

The MTC device may receive MTC information transmitted to a radio resource 3200 for transmission of MTC data, using information (for example, radio resource location information (information about a frequency band and a transmission time), modulation information, and encoding information for MTC service) in the corresponding control information block 1000.

The second resource allocation method is to allocate an MTC device (or a group of MTC devices) identifier to a radio resource for transmission of MTC data.

In other words, the second resource allocation method is a method of writing an MTC device (a group of MTC devices) identifier in a radio resource for transmission of MTC data. That is, the second resource allocation method is a method of transmitting an MTC device (or a group of MTC devices) identifier, together with scheduling information about a downlink or uplink radio resource for the MTC device (or the group of MTC devices), through a radio resource for transmission of MTC data.

In other words, the second resource allocation method is to transmit the control information block 1000 including scheduling information, such as resource allocation information, transport format information, etc., through a second downlink control resource area 3100 which is a radio resource for transmission of download data. ANn MTC device (or a group of MTC devices) identifier is also included in the second downlink control resource area 3100 and transmitted.

According to another example of the second resource allocation method, the control information block 1000 of the first downlink control resource area 2100 transmits scheduling information for a radio resource 3200 for transmission of MTC data using a designated identifier for MTC service scheduling.

When the base station encodes the radio resource 3200 for transmission of MTC data, the base station may mask Cyclic Redundancy Check (CRC) bits with an identifier allocated to a specific MTC device (or a specific group of MTC devices), or scramble a code block sequence of MTC traffic data to be transmitted through the radio resource 3200 for transmission of MTC data, using a specific MTC device (or a specific group of MTC devices) identifier.

The designated identifier for MTC service scheduling may be set by designating a part of C-RNTIs as identifiers for MTC service, and allocating the designated identifiers.

The scheduling information may include location information (information about a frequency band and a transmission time), modulation information, encoding information, etc. of the radio resource 3200.

That is, according to the current embodiment, it is possible to demodulate and decode the MTC traffic data transmitted through the radio resource 3200 for transmission of MTC data using an identifier allocated to a specific MTC device (or a specific group of MTC devices). The identifier allocated to the specific MTC device (or the specific group of MTC devices may be different from a scheduling identifier (for example, a C-RNTI) for a general user terminal (that is, a non-MTC device).

Accordingly, when the base station masks CRC bits with an identifier allocated to a specific MTC device (or a specific group of MTC devices), or scrambles a codeword sequence of a transport block of traffic data to be transmitted through the radio resource 3200 for transmission of MTC data, using the MTC device (the group of MTC devices) identifier, in order to encode the radio resource 3200 for transmission of MTC data, an identifier(s) designated and managed for the MTC device (or the group of MTC devices) can be used.

Another example of the second resource allocation method is a method of fixing the location of the radio resource 3200 for transmission of MTC data, and allocating the radio resource 3200.

That is, when no information for MTC service needs to be transmitted, a frequency band at a specific location is allocated to general user terminals that are non-MTC devices, and if there is packet data for MTC service, the frequency band at the specific location is allocated as the radio resource 3200 for transmission of MTC data for MTC service.

For this, a method of pre-defining location information (information about a frequency band and a transmission time), modulation information, and encoding information of the radio resource 3200 for transmission of MTC data may be used.

Also, in order to provide MTC service throughout the service area of an arbitrary base station or the service areas of a plurality of base stations, it is possible to notify system information to all MTC devices belonging to the service area of the base station, or to notify a control message to a specific MTC device (or a group of MTC devices).

In this case, in order to inform of scheduling information about the radio resource 3200 for transmission of MTC data, MTC service packet data may be transmitted through the radio resource 3200 for transmission of MTC data, without having to transmit the control block information 1000 which is scheduling information, through the first downlink control resource area 2100 or the second downlink control resource area 3100 which are radio resources for transmission of downlink control information.

In the current embodiment, likewise, when the radio resource 3200 for transmission of MTC data is encoded, a method of masking the CRC bits for the code block sequence of traffic data to be transmitted with an identifier(s) allocated to a specific MTC device (or a group of MTC devices) may be used.

Figure 3:
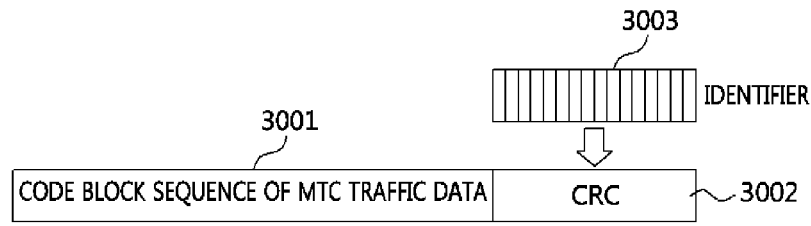
FIG. 3 is a view for explaining the concept of a method of representing MTC device identifiers through a radio resource for transmission of MTC data.

FIG. 3 is a view for explaining the concept of a method of representing MTC device identifiers through a radio resource for transmission of MTC data.

In the method illustrated in FIG. 3, when a radio resource 3200 (see FIG. 2) for transmission of MTC data is encoded, a method of masking CRC bits with an identifier(s) allocated to a specific MTC device (or a group of MTC devices) is used.

That is, the method illustrated in FIG. 3 is to encode MTC service information or configure a transmission block in such a manner to mask an identifier(s) allocated to an MTC device (or a group of MTC devices) in CRC bits 3002 added to a code block sequence of MTC traffic data 3001. Accordingly, when an MTC device receives an MTC packet, the MTC device can recognize an MTC device (a group of MTC devices) to which the MTC packet has to be transmitted, based on an identifier(s) masked in the CRC bits of the MTC packet.

Also, a method of scrambling a code block sequence of MTC traffic data to be transmitted through the radio resource 3200 for transmission of MTC data, using an MTC device (or a group of MTC devices) identifier can be used.

The third resource allocation method is to transmit uplink resource allocation information together with MTC downlink data packets.

In order to provide MTC service, a base station may request an MTC device (a group of MTC device) to transmit MTC packet data through an uplink, while transmitting downlink data for the purpose of notifying modification of related control information, updating software for MTC service, etc.

In this case, the base station may transmit a control information block which is scheduling information of a uplink radio resource for the corresponding MTC device, while transmitting packet data for MTC service through a radio resource 3200 (see FIG. 2) for transmission of MTC data. That is, as shown in FIG. 2, the base station may transmit both MTC control information 3210 for the MTC device and MTC data information 3220 for MTC service through the radio resource 3200 for transmission of MTC data.

Here, the MTC control information 3210 may be control information that has to be transmitted to the MTC device receiving the MTC data information 3220. Also, by inserting an identifier(s) of a MTC device (or a group of MTC devices) into the MTC control information 3210, control information for another MTC device (or another group of MTC devices) may be transmitted.

The MTC control information 3210 may be generated and signaled in the form of a MAC Control Element (MAC CE) by a MAC layer.

The MTC control information 3210 may include control parameters, such as resource allocation information, a transport format, transmission timing information (a transmission time, a transmission time interval, a continuous (discontinuous) transmission period, etc.), an identifier(s) of an MTC device (a group of MTC devices), power control information, uplink timing adjustment information, retransmission-related information, etc., in the form of a field configuring a MAC CE.

As shown in FIG. 2, the method of transmitting the MTC control information 3210 through the radio resource 3200 for transmission of MTC data also may be applied to the case of transmitting control information for general user terminals (for example, smart phones) other than MTC devices, if data is generated at relatively long time intervals and the amount of the generated data is relatively small.

By using this method, it is possible to partially overcome the problem of a shortage of radio resources for transmission of downlink control information.

Several preferred embodiments of radio resource allocation methods according to the present invention have been described above with reference to FIGS. 2 and 3, however, the present invention is not limited to the preferred embodiments. That is, two or more of the method of transmitting scheduling information of a radio resource for transmission of MTC data for substantial resource allocation to a specific MTC device (or a specific group of MTC devices), the method of allocating an identifier(s) to an MTC device (a group of MTC devices), and the method of allocating a resource(s) to an MTC device (or a group of MTC devices) using an identifier allocated to the MTC device (the group of MTC devices) may be selectively combined.

Also, the case where a re-transmission mechanism using Hybrid Automatic Repeat reQuest (H-ARQ) is applied to improve reliability of transmission of MTC packet data is considered.

In the case of a re-transmission mechanism for MTC, unlike a re-transmission mechanism that is applied to the transmission and reception procedure of a general user terminal, an MTC device (a group of MTC devices) may be set to transmit feedback information (that is, ACK information) for H-ARQ only when the MTC device (the group of MTC devices) has successfully received downlink (or uplink) packet data.

Thereby, it is possible to lower a modulation error ratio of uplink (or downlink) feedback information informing successful reception of downlink (or uplink) MTC data or control information, which leads to improvement of H-ARQ performance and reduction of consumption power of the MTC device (the group of MTC devices).

Figure 4:
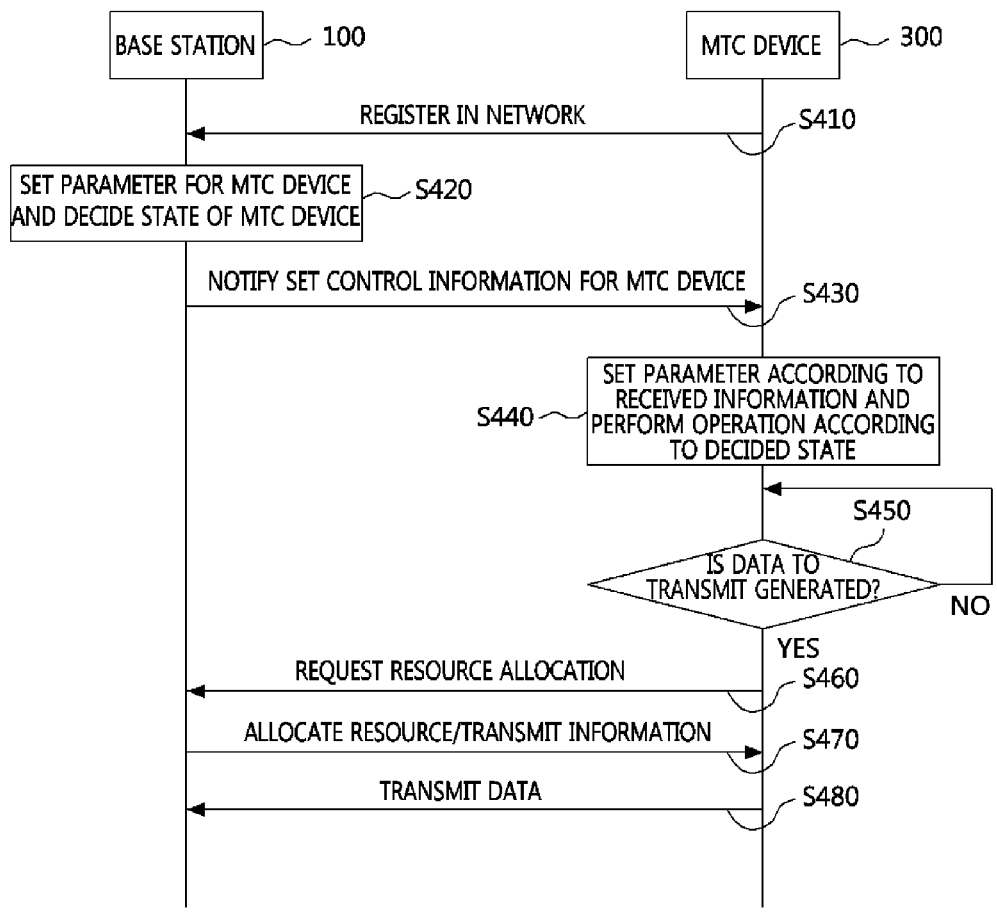
FIG. 4 is a flowchart illustrating a method for network registration and packet data transmission between an MTC device and a base station, according to an example embodiment of the present invention.

FIG. 4 is a flowchart illustrating a method for network registration and packet data transmission between an MTC device (or a group of MTC devices) 300 and a base station 100, according to an example embodiment of the present invention.

That is, FIG. 4 shows a method in which the MTC device 300 registers itself in a network and transmits packet information through the base station 100.

The MTC device 300 registers itself in a network through the base station 100 (S410). A procedure in which the MTC device 300 is connected to the base station 100 for registration is the same as a procedure in which a general user terminal is connected to a base station. At this time, the MTC device 300 transmits control information including information about the MTC device 300, MTC service type, etc. to the base station 100 for network registration.

The base station 100 which has received a request for connection to the network from the MTC device 300 sets a parameter for the MTC device 300 and determines whether to establish connection to the network, based on the control information including the information about the MTC device 300, the MTC service type, etc., received from the MTC device 300 (S420).

That is, the base station 100 sets a parameter for setting MTC service for the MTC device 300, and determines whether to set the MTC device 30 to a connected state for exchanging packet information with the base station 100, or to an idle state corresponding to a disconnected state.

In the connected state, the base station 100 stores the information about the MTC device 300 or the information about the MTC service type and manages them, or the base station 100 maintains a signaling channel (or a bearer) for transmitting a control message for MTC service.

In the idle state, the base station 100 neither stores nor manages information about the MTC device 300 or information about the MTC service type, and does not manage connection to a channel. That is, in the idle state, the base station 100 recognizes only the fact that the MTC device 300 has registered itself in the network and is located in an arbitrary area.

After setting a parameter for the MTC device/service and deciding a state of the MTC device 300, the base station 100 notifies control information regarding the parameter and the decided state to the MTC device 300 (S430).

The control information may include the state of the MTC device 300, the identifier of the MTC device 300, device group information, encryption information (related to an encryption key), and software version information.

The MTC device 300 which has received information about the parameter for the MTC device/service and the state of the MTC device 300 from the base station 100, sets control parameters according to the received information, and performs operation according to the decided state (S440).

In regard of a plurality of MTC devices 300 (300 for each), the MTC devices 300 may perform different operations according to state information received from the base station. For example, MTC devices in the connected state search for or measure a base station (a serving base station) to which they belong, neighboring base stations, or adjacent MTC devices, at regular time intervals. Also, the MTC devices monitor downlink control information periodically or every transmission period (for example, Tm of FIG. 2), according to the parameter set by the base station 100 to check system information transmitted from the base station 100, thereby updating system information and related software for MTC service.

Meanwhile, MTC devices in the idle state monitor a paging message transmitted from the base station 100, periodically, wherein the paging message informs of a change of downlink reception-related or MTC-related control information. Also, the MTC devices may perform a procedure of periodically monitoring signals from a base station to which they belong and neighboring base stations in order to support a mobility function as necessary.

If the MTC device 300 generates data that has to be transmitted to the base station 100 (S450), the MTC device 300 requests the base station 100 to allocate an uplink radio resource for transmitting the data (S460).

At this time, the MTC device 300 may request the base station 100 to allocate a radio resource through an arbitrary connection procedure that is applied to a mobile communication system. Also, the MTC device 300 may request the base station 100 to allocate a radio resource through a different connection procedure, according to the state of the MTC device 300, decided in operations S420 and S430. That is, MTC devices that are in the idle state may use the arbitrary connection procedure, and MTC devices that are in the connected state may use a predetermined connection procedure only for the MTC devices that are in the connected state, as well as the arbitrary connection procedure. For example, the MTC devices that are in the connected state may perform a resource allocation request procedure through a uplink control channel for a resource request, allocated by the base station 100 for an arbitrary MTC device (or an arbitrary group of MTC devices), or through a uplink connection channel dedicated to an MTC device (a group of MTC devices).

In response to the resource allocation request from the MTC device 300, the base station 100 may transmit scheduling information for the requested radio resource, or information for MTC service to the MTC device 300 (S470). The MTC device 300 which has received the scheduling information for the requested radio resource transmits the data through the corresponding uplink radio resource (S480).

Operations 5420 through 5480 may be selectively performed according to a method of transmitting scheduling information about a radio resource for transmission of MTC data, for substantial resource allocation to the MTC device (or the group of MTC devices) 300, a method of allocating an identifier(s) to the MTC device (or the group of MTC devices) 300, etc. For example, the MTC device 300 which has received MTC control information 3210 as shown in FIG. 2 in operation 5430, may perform operation 5480 directly without performing operations 5460 and 5470 for resource allocation, to transmit data to the base station 100.

According to the current example, an identifier that is different from a scheduling identifier (for example, a C-RNTI) for a general user terminal (that is, a non-MTC terminal) may be allocated to the MTC device (the group of MTC devices) 300. As a result, since a significantly large number of MTC devices can be managed in a connected state, it is possible to efficiently provide MTC service without requiring connection establishment for transmission and reception of MTC packet data, validation of an MTC device (a group of MTC devices), an encryption procedure, etc.

Figure 5:
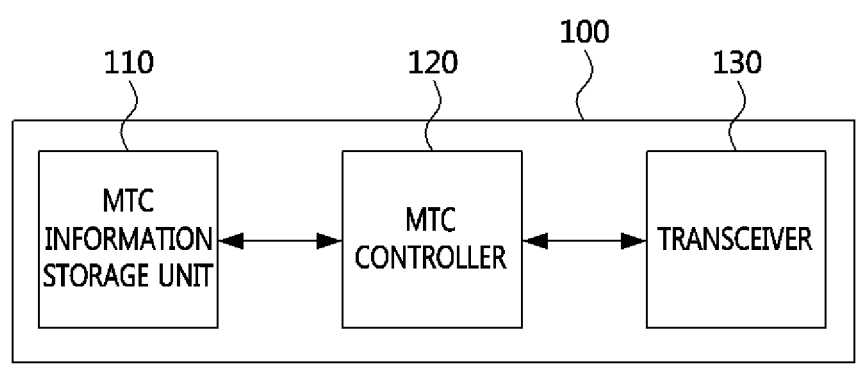
FIG. 5 is a block diagram illustrating a base station according to an example embodiment of the present invention.

FIG. 5 is a block diagram illustrating a base station 100 according to an example embodiment of the present invention.

Referring to FIG. 5, the base station 100 includes an MTC information storage unit 110, an MTC controller 120, and a transceiver 130.

The MTC information storage unit 110 may store various information required for providing MTC service. For example, the MTC information storage unit 110 may store at least one piece of information among software information for MTC service, an identifier of at least one MTC device or at least one group of MTC devices, and encoding information.

The MTC controller 120 determines, if MTC data that is to be transmitted to an MTC device is generated, whether the location of a radio resource area for transmission of MTC data is variable in a transmission period. If the location of a radio resource area for transmission of MTC data is variable in a transmission period, the MTC controller 120 creates a control information block including MTC scheduling information, and includes the control information block in a first downlink control resource area or a second downlink control resource area to configure a downlink frame.

Also, the transceiver 130 transmits the downlink frame configured by the MTC controller 120, and receives signals transmitted from at least one MTC device.

Figure 6:
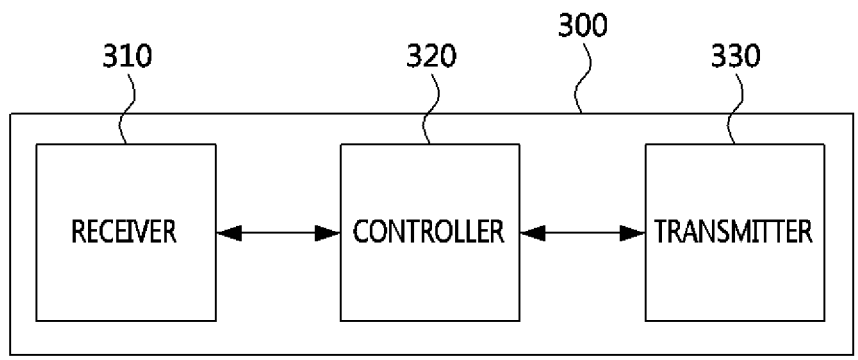
FIG. 6 is a block diagram illustrating an MTC device according to an example embodiment of the present invention.

FIG. 6 is a block diagram illustrating an MTC device 300 according to an example embodiment of the present invention.

Referring to FIG. 6, the MTC device includes a receiver 310, a controller 320, and a transmitter 330.

The receiver 310 receives a downlink frame from a base station. The controller 320 searches for a control information block in a downlink control resource area of the received downlink frame, determines whether the control information block is for MTC service or includes control information whose destination is a corresponding MTC device, using an MTC device identifier or an identifier designated for MTC service scheduling, and extracts MTC service packet data included in a radio resource for transmission of MTC data, using the control information block, according to the results of the determination.

If the control information block is for MTC service, the controller 320 acquires a radio resource for transmission of MTC data, using the identifier designated for MTC service scheduling, and demodulates and decodes MCT traffic data transmitted to the corresponding MTC device using the MTC device identifier.

Meanwhile, if the control information block includes control information whose destination is the corresponding MTC device, the controller 320 demodulates and decodes MTC traffic data transmitted to the corresponding MTC device using the MTC device identifier.

Also, the transmitter 330 transmits an uplink frame to the base station, and the controller 320 may control the transmitter 330 to transmit feedback information to the base station only when downlink packets transmitted from the base station have been successfully received.

If the location of the radio resource for transmission of MTC data is fixed, according to another embodiment of the present invention, the controller 320 and the receiver 310 of the MTC device may operate as follows:

That is, in this case, the receiver 310 receives information about a location of a radio resource for transmission of MTC data from the base station, through system information or a control message, and the controller 310 detects the location of the radio resource for transmission of MTC data from a downlink frame received from the base station, and extracts MTC service packet data included in the radio resource for transmission of MTC data using the MTC device identifier.

Figure 7:
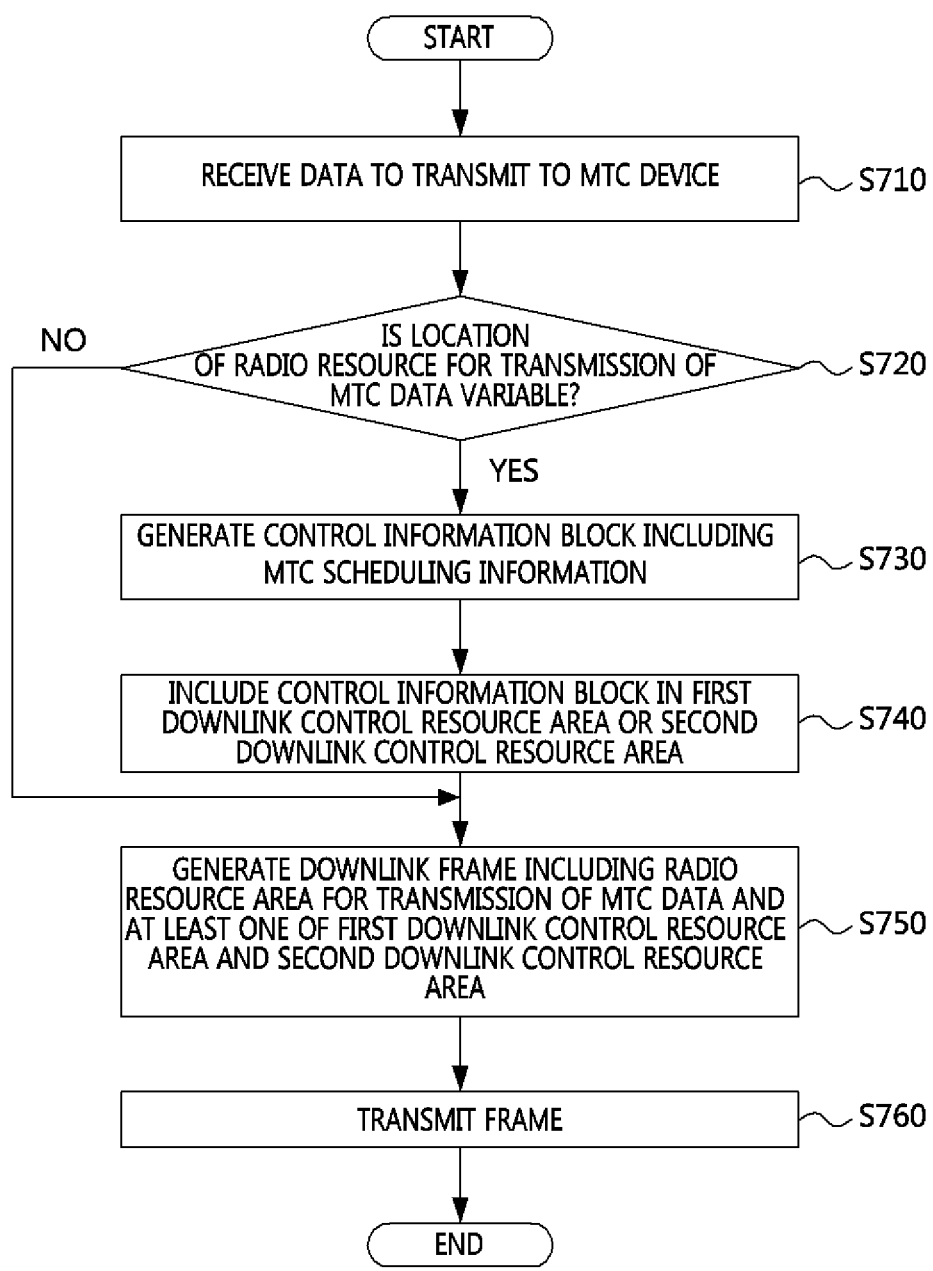
FIG. 7 is a flowchart illustrating a resource allocating method for MTC, according to an example embodiment of the present invention.

FIG. 7 is a flowchart illustrating a resource allocating method for MTC, according to an example embodiment of the present invention.

The resource allocating method illustrated in FIG. 7 may be performed by a base station. The following description relates to the case where the resource allocating method is performed by a base station, however, it is also possible that the resource allocating method is performed by another entity located in a network in connection to a base station.

If data that is to be transmitted to at least one MTC device is generated (S710), the base station determines whether the location of a radio resource for transmission of MTC data is variable in a transmission period, based on MTC information stored therein (S720). A procedure of determining whether the location of a radio resource for transmission of MTC data is variable may be omitted when the base station knows information about a fixed location of a radio resource for transmission of MTC data. Also, MTC data that is to be transmitted to at least one MTC device may be received from the network, or created by the base station.

If the location of the radio resource for transmission of MTC data is variable, the base station generates a control information block including MTC scheduling information (S730).

Then, the base station includes the control information block in a first downlink control resource area or a second downlink control resource area (S740), and generates a downlink frame including a radio resource area for transmission of MTC data and at least one of the first downlink control resource area and the second downlink control resource area (S750).

Meanwhile, if it is determined in operation S720 that the location of the radio resource for transmission of MTC data is fixed, operation S750 of generating the downlink frame is directly performed without performing operation S730 of generating the control information block and operation S740 of including the control information block in the first or second downlink control resource area.

Thereafter, the base station transmits the downlink frame to the MTC device (S760).

Figure 8:
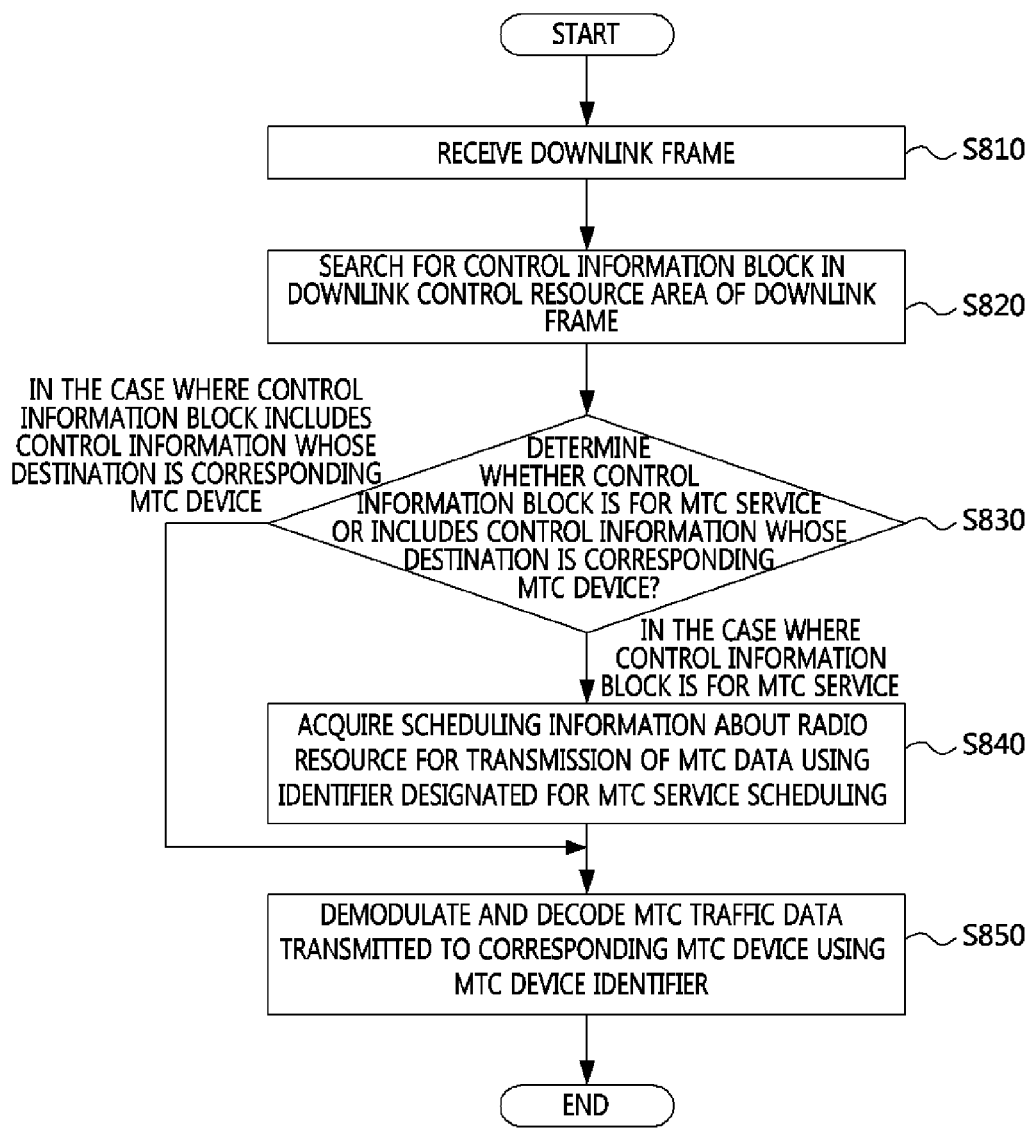
FIG. 8 is a flowchart illustrating a data transmission and reception method for an MTC device, according to an example embodiment of the present invention.

FIG. 8 is a flowchart illustrating a data transmission and reception method for an MTC device, according to an example embodiment of the present invention.

If the MTC device receives a downlink frame from a base station (S810), the MTC device searches for a control information block in a downlink control resource area of the downlink frame (S820).

Then, the MTC device determines whether the control information block is for MTC service or includes control information whose destination is the corresponding MTC device, using an MTC device identifier or an identifier designated for MTC service scheduling (S830). In detail, operation S830 may be performed by checking an identifier (for example, a C-RNTI) masked in the CRC bits of the control information block using several identifiers (for example, C-RNTIs for MTC) allocated to the MTC device, that is, an MTC device identifier, an identifier designated for MTC service scheduling, etc.

The MTC device extracts MTC service packet data included in a radio resource for transmission of MTC data using the control information block, according to the results of the check.

In detail, if the control information block is for MTC service, that is, if the control information block has been transmitted together with an MTC scheduling identifier, the MTC device acquires scheduling information about a radio resource for transmission of MTC data using the identifier designated for MTC service scheduling (S840), and demodulates and decodes MTC traffic data transmitted to the corresponding MTC device using the MTC device identifier (S850).

Here, operation S850 corresponds to a procedure of acquiring demodulation and decoding information by using the MTC device identifier to check CRC masking of MTC data CRC-masked with the MTC device identifier or check a scrambling sequence of MTC data scrambled with the MTC device identifier.

Meanwhile, if the control information block includes control information whose destination is the MTC device, that is, if the control information block has been transmitted together with the MTC device identifier, operation S850 of demodulating and decoding MTC traffic data transmitted to the corresponding MTC device using the MTC device identifier is performed.

While the example embodiments of the present invention and their advantages have been described in detail, it should be understood that various changes, substitutions and alterations may be made herein without departing from the scope of the invention.

What is claimed is:

1. A resource allocating method for machine type communication (MTC), comprising:
   determining, if MTC data that is to be transmitted to an MTC device is generated, whether a location of a radio resource for transmission of MTC data is variable in a transmission period;
   creating a control information block including MTC scheduling information if the location of the radio resource for transmission of MTC data is variable;
   including the control information block in a first downlink control resource area or a second downlink control resource area, wherein:
      the first downlink control resource or second downlink control area of a frame is searched, for the control information block,
      determining whether the control information block is for MTC service or includes the control information whose destination is the MTC device using an MTC device identifier or an identifier designated for MTC service scheduling; and
      extracting MTC service packet data included in the radio resource for transmission of the MTC data, using the control information block, according to results of the determination;
   configuring a frame including a radio resource area for transmission of MTC data and at least one area of the first downlink control resource area and the second downlink control resource area; and
   transmitting the frame.

2. The resource allocating method of claim 1, wherein the first downlink control resource area includes control information for general user terminals, and further includes control information for MTC devices.

3. The resource allocating method of claim 1, wherein the second downlink control resource area includes control information for MTC devices.

4. The resource allocating method of claim 1, wherein the control information block transmits the MTC scheduling information together with MTC device identifiers.

5. The resource allocating method of claim 1, wherein the control information block transmits the MTC scheduling information using an identifier designated for MTC service scheduling.

6. The resource allocating method of claim 5, wherein the radio resource area for transmission of MTC data includes MTC data, and wherein the MTC data includes Cyclic Redundancy Check (CRC) bits masked with an MTC device identifier, or a code block sequence of MTC traffic data scrambled with the MTC device identifier.

7. A data transmission and reception method that is performed by a machine type communication (MTC) device, comprising: receiving a downlink frame from a base station; searching for a control information block in a downlink control resource area of the downlink frame; determining whether the control information block is for MTC service or includes control information whose destination is the MTC device, using an MTC device identifier or an identifier designated for MTC service scheduling; and extracting MTC service packet data included in a radio resource for transmission of MTC data, using the control information block, according to the results of the determination.

8. The data transmission and reception method of claim 7, wherein the extracting of the MTC service packet data included in the radio resource for transmission of MTC data, using the control information block, according to the results of the determination comprises, if the control information block is for MTC service, acquiring scheduling information about the radio resource for transmission of MTC data using the identifier designated for MTC service scheduling; and demodulating and decoding MTC traffic data transmitted to the MTC device using the MTC device identifier.

9. The data transmission and reception method of claim 7, wherein the extracting of the MTC service packet data included in the radio resource for transmission of MTC data, using the control information block, according to the results of the determination comprises, demodulating and decoding MTC traffic data transmitted to the MTC device using the MTC device identifier if the control information block includes control information whose destination is the MTC device.

10. The data transmission and reception method of claim 7, further comprising transmitting feedback information to the base station if a downlink packet transmitted from the base station has been successfully received.

11. A resource allocating apparatus for machine type communication (MTC), comprising:
   an MTC data storage unit configured to store at least one piece of information among software information for MTC service, an identifier of at least one MTC device or at least one group of MTC devices, and encoding information;
   an MTC controller configured to determine whether a location of a radio resource area for transmission of MTC data is variable in a transmission period if MTC data that is to be transmitted to an MTC device is generated, to create a control information block including MTC scheduling information if the location of the radio resource area for transmission of MTC data is variable in the transmission period, to include the control information block in a first downlink control resource area or a second downlink control resource area, and to configure a downlink frame; and a transceiver configured to transmit the downlink frame configured by the MTC controller, and to receive a signal transmitted from at least one MTC device.

12. The resource allocating apparatus of claim 11, wherein the first downlink control resource area includes control information for a general user terminal, and further includes control information for an MTC device.

13. The resource allocating apparatus of claim 11, wherein the second downlink control resource area includes control information for an MTC device.

14. The resource allocating apparatus of claim 11, wherein the control information block transmits the MTC scheduling information together with an MTC device identifier.

15. The resource allocating apparatus of claim 11, wherein the control information block transmits the MTC scheduling information using an identifier designated for MTC service scheduling.

16. The resource allocating apparatus of claim 11, wherein the radio resource area for transmission of MTC data includes MTC data, and the MTC data includes Cyclic Redundancy Check (CRC) bits masked with the MTC device identifier, or a code block sequence of MTC traffic data scrambled with the MTC device identifier.

* * * * *